Feb. 27, 1945.  E. S. REID  2,370,193
FIBROUS CONDUIT AND METHOD OF MANUFACTURE
Filed Sept. 5, 1942   2 Sheets-Sheet 1
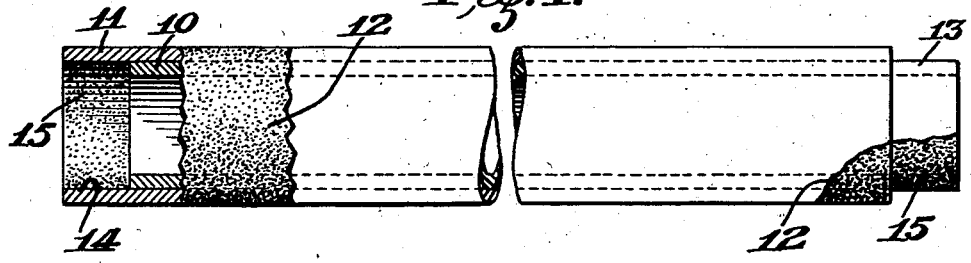
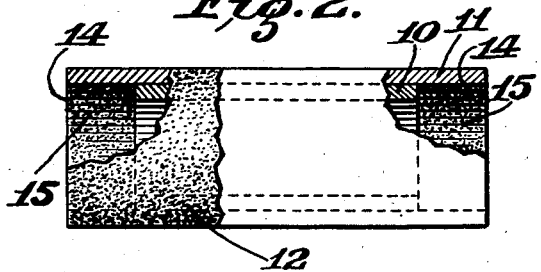 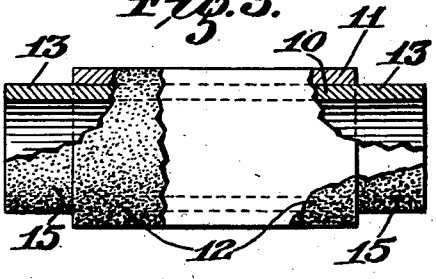
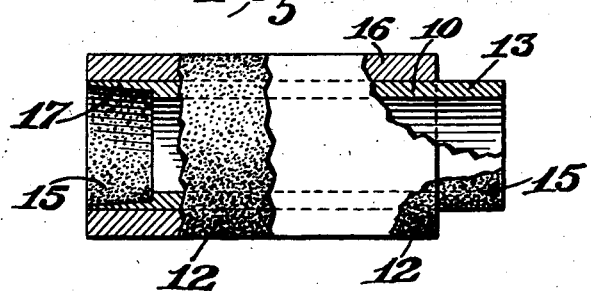
Inventor:
Edward S. Reid,
By Warley L. Parrott
his Attorney.

Feb. 27, 1945.   E. S. REID   2,370,193
FIBROUS CONDUIT AND METHOD OF MANUFACTURE
Filed Sept. 5, 1942   2 Sheets-Sheet 2

INVENTOR
Edward S. Reid
ATTORNEY

Patented Feb. 27, 1945

2,370,193

UNITED STATES PATENT OFFICE 2,370,193

FIBROUS CONDUIT AND METHOD OF MANUFACTURE

Edward S. Reid, Charlotte, N. C., assignor to Sonoco Products Company, a corporation of South Carolina Application September 5, 1942, Serial No. 457,427

13 Claims. (Cl. 138—78)

My invention relates to fibrous tubes and more particularly to a combination of two or more paper tubes in concentric relationship to form a service conduit. This conduit is useful for housing electric wires or cables and may be used in lieu of the usual, heavier and more expensive tile or wood conduits. In certain forms it is also useful for conducting water or gas, and will therefore serve as a less expensive substitute for metal pipe.

One of the most important features of my invention is the time saving and economic method and means of providing plug and socket forms at the ends of the conduit sections for coupling purposes. By utilizing what I have termed a "slip-sleeve" construction, I provide plug or socket forms at the ends of the paper tubes without the necessity of any grinding, cutting, compressing or any of the conventional procedures for effecting endwise connections between conduit sections.

In accordance with my invention I form the desired conduit by partially nesting or telescoping a fibrous tube of a certain diameter into another similar tube of just sufficiently larger diameter to afford a sliding or slip fit. Thus the two tubes or sleeves are combined in concentric, slip-sleeve fashion.

Now to obtain the plug and socket forms or couplings at the ends of the concentric tubes, one tube is pulled out or displaced endwise from the other for a desired short distance, such as 1-3 inches. This automatically produces, at the ends of the tubes, the coupling forms, which may be termed as male and female or plug and socket. The usually necessary operations of cutting, grinding, or compressing are completely avoided and remarkable savings in labor and tools are obtained.

In practice it is usually desirable to have the plug or socket forms of uniform length on all conduit sections so that the desired neat and reliable fit or coupling is obtained at the junctions of the conduit sections laid end to end. I obtain this result by using tubes of the same length so that when telescoped they form the same length or size plug and socket at the respective ends of the conduit section.

To maintain the two tubes in displaced position, whereby the coupling forms are obtained, any suitable adhesive such as for example sodium silicate, or dextrine may be employed. When the tubes are not subsequently treated this adhesive may constitute the sole and permanent bonding agent. However, the tubes are usually, subsequently, impregnated to render them water resistant so that they may be embedded in soil or concrete or may be exposed directly to the weather. The impregnating material, if of an adhesive type, may then serve as a supplemental or principal bonding agent to hold the two tubes in the desired displaced arrangement.

For the general purposes of my invention, I have found it advantageous to use as an impregnating material, a coal tar pitch manufactured by the Barrett Company and well known in the trade as "Fibre Pitch." This material is solid at ordinary temperatures but upon heating forms a sufficiently thin fluid to penetrate the paper tubes without the use of an organic solvent or thinner. To facilitate impregnation of the tubes with this Fibre Pitch, I usually carry out the treatment in a heated, closed, vessel which may be operated under vacuum or positive pressure. Alternating between sub and super atmospheric pressures gives good results for certain types of tubes.

Another very desirable feature of my invention is made possible from the discovery that this Fibre Pitch or equivalent material can serve, when properly handled, as the bonding agent for coupling together sections of the conduit. For this purpose an excess of the pitch is permitted to remain on the plug and socket coupling ends, after the impregnating treatment. This excess coating, which is very hard at room temperature, may be softened by heat, e. g. a blow torch, and while soft the abutting ends of the conduit sections can be brought together; the plug end of one section fitting into the socket end of the next section. Then upon cooling the pitch again hardens and sets to provide a strong, rigid joint or coupling.

While I have mentioned especially coal tar pitch, my invention contemplates the use of any and all other suitable thermoplastic or thermosetting agents including suitable natural or synthetic gums and resins. The material covering the ends of the tubes is advantageously thermoplastic so that it may be softened for coupling and uncoupling purposes.

The slip-sleeve conduit unit of my invention may be made in any desired diameter or length. Commercially useful examples are, 10 foot lengths and diameters of 1 inch to 6 inches. The wall thickness of the conduit is made up of the combined thicknesses of the two paper tubes. Total wall thickness of ½ inch to 1 inch are commonly used. The paper or fibrous tubes used in my invention may be convolutely or spirally wound tubes. Spirally wound tubes are generally advantageous for conduit purposes since they can be made economically in longer lengths.

In actual installations, it is often necessary to use a shorter length section to "piece-out" the final length or space. For this purpose I have provided relatively short couplings of about one foot or less in length. These couplings are also made by my slip-sleeve method and provide the desired plug or socket forms at their respective ends.

These couplings differ in one respect from the regular length conduit sections in that, the two tubes of which they are made, are not of identical length but are of appreciably different lengths. By varying the respective lengths of the outer and inner sleeves or tubes, different type couplings may be obtained; for example couplings having two plug ends, or two socket ends, or one plug and one socket end.

For purposes of connecting my type of conduit to that of some other make, which uses ground or cut plugs or sockets, I have provided a suitable adapter. This adapter also comprises two tubes in concentric, slip-sleeve arrangement with plug or socket ends, but has one or both ends tapered to fit the complementary part of the other make of conduit. This tapering may be effected by any of the conventional tooling operations. The lengths of the two tubes comprising the adapters may be varied as described above for the couplings, to provide desired plug and socket ends.

The constructional features of my invention are illustrated in the accompanying drawings, in which:

Fig. 1 is a side elevational view, partly in section, of the slip-sleeve conduit unit of my invention;

Figs. 2 and 3 are side elevational views, partly in section, of my slip-sleeve couplings; and Fig. 4 is a side elevational view, partly in section, of a slip-sleeve adapter.

Figures 5, 6:
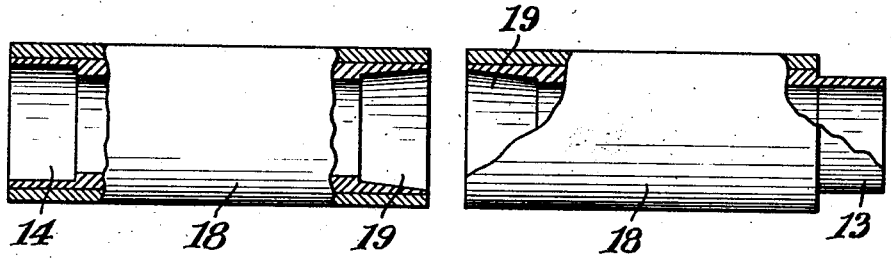

The conduit shown in Fig. 1 is comprised of an inside paper tube 10, which for example may have an outside diameter of slightly less than 3½ inches, and a wall thickness of ¼ inch; and an outer paper tube 11, which for example, may have an inside diameter of slightly more than 3½ inches and a wall thickness of ¼ inch. These tubes 10 and 11 are bonded together in the telescopic arrangement shown and are impregnated throughout their thickness with Fiber Pitch as indicated at 12. The two tubes being of the same length and displaced lengthwise as shown, provide a plug 13 and a socket 14, at their respective ends. These members connect with complementary shaped ends of similar conduit sections when installing a long line of conduit. The excess pitch indicated at 15 provides means for bonding the sections together by softening with heat as described above.

The coupling in Fig. 2 comprises inner and outer paper tubes 10 and 11 the same as Fig. 1 except that the overall length is much less, and the inner tube 10 is not of the same length as the outer tube 11. This arrangement provides a socket 14 at each end.

In Fig. 3 the coupling arrangement is the converse of that in Fig. 2, so that a plug 13 is provided at each end of the coupling.

The adapter shown in Fig. 4 comprises an inner tube 10 that is tapered on one end as shown at 17 to form a socket, and extends beyond the outer tube at the other end to form a plug 13. The plug 13 will connect with any of the regular sockets 14 in my conduits and the tapered socket 15 will connect with a reversely tapered plug of some other conduit section. The outer tube 16 of this adapter has a thicker wall than the regular tubes to provide extra strength and support particularly along the tapered and thinner wall section 17 of the inner tube.

A commercially advantageous method of impregnating the fibrous conduit, couplings, and adapters of my invention to render them water resistant, is as follows: The conduits, couplings, or adapters, previously assembled in slip-sleeve manner and bonded with adhesive, are placed in a tank or suitable chamber containing fiber pitch heated to about 260° F. to 300° F. At such temperatures the pitch is in a fluent state and is absorbed by the paper tubes, which are permitted to remain in the pitch for varying lengths of time depending upon the wall thickness of the tubes and the ultimate use of the conduit. Generally, the tubes remain in the treating chamber for a period of thirty minutes to two hours.

To facilitate the impregnation, a vacuum of about 12 inches to 13 inches may be applied to the treating chamber and maintained for a period of about thirty minutes. The vacuum is then broken and a positive pressure of about twenty pounds is then applied for a period of about 15 minutes to 45 minutes.

At the higher temperatures the pitch is more fluid and will therefore run off of the tubes when they are removed from the treating tank, particularly from the inside surface of the tubes since it will remain hotter than the outside surface after the tubes are removed from the tank. At a temperature of about 290° F. to 300° F. the pitch will quickly run off the inner surface of the tubes and leave a slick smooth finish. This is desirable where the conduits, etc., are to be used for electrical wires; the smooth surface facilitating drawing of the wires or cables through the conduits. Where the conduits, etc., are to be used for waterpipe, it is advantageous to leave an excess of the pitch both on the inner and outer surfaces thereof to render the conduits, etc. water resistant. To obtain this result a lower temperature of about 260° F. to 270° F. is maintained in the impregnating tank.

In the above described operations the ends of the paper conduits will cool more rapidly, upon removal of the conduits from the impregnating tank, and will thereby cause an excess of the pitch to be deposited at these ends. This is desirable since the excess material will serve as a bonding agent, upon heating with a blow torch or the like, as previously described.

It will be apparent from the above description that various modifications may be made of the representative embodiments of conduit, couplings and adapters shown in Figs. 1 to 4. For example the couplings in Figs. 2 and 3 may be formed, if desired, from tubes of equal length and displaced so as to provide a plug and a socket at the respective ends. Likewise, the outer sleeve of the adapter may be machined or tooled at the end to provide a tapered plug or socket. Also, the inner sleeve may be made shorter than the outer sleeve and thereby provide two socket ends, one or both of which may be tapered. It also happens, in some projects, that it is required to use tubing of other makes, possibly of end-formation and dimensions differing from that of the standard tubing of the present invention. To meet such contingency special adapter-couplings 18 are provided, as shown in Figs. 5 to 9, inclusive. These adapter-couplings have, at one end, either an exact duplicate of the bell or socket portion 14 or of the pin or plug portion 13 of the standard tube of the present invention. At the other end of the adapter-coupling is either a bell or socket portion 19, of form and dimension to receive the pin or plug portion of the different make of tubing, or else a pin or plug portion 20 is provided to fit into the bell or socket portion of the said tubing of a different make.

In Fig. 5, the illustrated adapter-coupling 18 is female at both ends, i. e., it has at one end a bell or socket 14 like that of the coupling shown in Fig. 2, and at its other end an adapting bell or socket 19 to receive the counterpart pin or plug end of the joined make of tube.

In Fig. 6, the adapter-coupling 16 is male-female, i. e., it has an adapting bell or socket 19 at one end like that of the element shown in Fig. 5, but, instead of the standard bell or socket 14, it is provided with a standard pin or plug 13 at its other end.

Figures 7, 8:
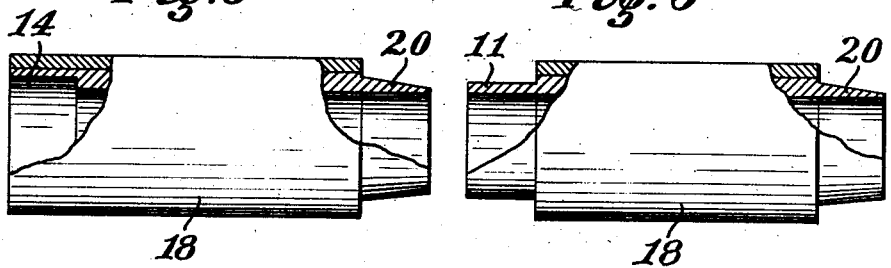
Figure 9:
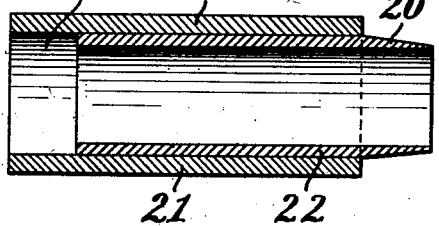

In Fig. 7, another male-female adapter-coupling 18 is illustrated. In this form, there is a standard bell or socket 14 at one end of the element and an adapting pin or plug 20 at the other end.

In Fig. 8, the adapter-coupling shown is entirely male, i. e., it has a standard pin or plug 11 at one end and an adapting pin or plug 20 at its opposite end.

Preferably, the respective adapter-couplings 18, illustrated in Figs. 5 to 8, inclusive, are of the slip-sleeve construction and impregnation treatment like the tubes of the present invention. However, inasmuch as the special adapting bells or sockets 19 and pins or plugs 20 have to be formed by a cutting or grinding process (or a combination of both) the wall thickness of these elements is appreciably increased to permit this operation without weakening the structure. An example of this wall-thickening appears in Figs. 5 to 8, inclusive. Therein, the walls of both the inner and the outer of the two slip-assembled tubes of the composite structure are thickened, equally, more than the thicknesses of the two tubes 10 and 11 composing either the standard tube sections of the present invention or those inner and outer tubes composing the standard couplings shown in Figs. 2 and 3.

Instead of producing the adapter-couplings 18 from slip-sleeve tubes of the same wall thickness, an even more practical and preferable way to construct the adapter-couplings is, to utilize an outer tube 21 of a maximum. increased wall thickness, inserting therein a tube 22 of minimum wall thickness. In this way the standard bell or socket portion 11 is produced without any cutting or grinding operation. So, too, there is less cutting away or grinding required to produce the adapting bell or sockets 19 and the adapting pins or plugs 20 of the adapter-couplings. Other possible modifications will appear to those skilled in this art, and are intended to come within the scope of my invention, some of the novel features of which are defined in the appended claims.

In the claims the word "conduit" is used in a generic sense and is intended to cover the conduit described herein and also the couplings and adapters made in accordance with this invention.

I claim:

1. A prefabricated, double-walled, fibrous conduit, comprising two paper tubes secured together by a film of adhesive, which is normally fluid at room temperatures, in fixed, concentric, telescoped relationship and longitudinally displaced for a short section of their length to provide correspondingly short plug or socket coupling elements of equal length at the respective ends of the conduit, the thus assembled and relatively positioned tubes being afterwards impregnated with a thermoplastic, water resistant material, that permeates said tubes and said adhesive and is effective in providing a strongly bonded unitary conduit construction, and said short, end, coupling elements having an excess coating thereon of said thermoplastic material which upon heating will serve as a bonding agent for joining said conduit with another similar section of conduit.

2. A prefabricated, double-walled, fibrous conduit comprising two fibrous tubes bonded together, in fixed, concentric, telescoped relationship, by an adhesive that is substantially fluid at room temperatures and is deposited as a relatively thin bonding film between the contiguous walls of the two tubes, said tubes being displaced for a short section of their length to provide correspondingly short plug or socket coupling elements of equal length at the respective ends of the conduit, and said conduit being adapted for impregnation by a suitable waterproofing material.

3. A prefabricated, impregnated, fibrous conduit adapted to be used underground, comprising two fibrous tubes bonded together in fixed, concentric, telescoped relationship by a normally fluid penetrative adhesive located in and upon the contiguous wall surfaces of the two tubes, said tubes being longitudinally displaced for a short section of their length to provide correspondingly short plug or socket coupling elements of equal length at the respective ends of the conduit, and said conduit being impregnated throughout with a water-resistant material.

4. A prefabricated, double-walled fibrous conduit comprising two paper tubes secured together by a relatively thin film of adhesive, which is normally fluid at room temperatures and which adhesive is located on the contiguous wall surfaces of the two tubes, said tubes being of equal length and of very slightly different diameters such that one tube affords a relatively close sliding fit inside of the other tube prior to bonding with said adhesive, the two tubes being longitudinally displaced for a short section of their length to provide correspondingly short plug or socket coupling elements of equal length at the respective ends of the conduit and being impregnated with a thermoplastic water-resistant material that renders the conduit durable and resistant to distintegration when used underground.

5. A fibrous conduit as defined in claim 2 and in which the plug or socket coupling elements are approximately 1 to 3 inches in length.

6. A prefabricated, double-walled, fibrous conduit comprising two fibrous tubes bonded together, in fixed, concentric, telescoped relationship, by an adhesive that is in the form of a soft, easily spreadable paste at room temperatures and is deposited as a relatively thin bonding film between the contiguous walls of the two tubes, said tubes being displaced for a short section of their length to provide correspondingly short plug or socket coupling elements of equal length at the respective ends of the conduit, and said conduit being adapted for impregnation by a suitable waterproofing material.

7. A prefabricated, double-walled, fibrous conduit comprising two fibrous tubes bonded together, in fixed, concentric telescoped relationship, by a water soluble sodium silicate adhesive that is in the form of a soft, easily spreadable paste at room temperatures and is deposited as a relatively thin bonding film between the contiguous walls of the two tubes, said tubes being displaced for a short section of their length to provide correspondingly short plug or socket coupling elements of equal length at the respective ends of the conduit, and said conduit being adapted for impregnation by a suitable waterproofing material.

8. A prefabricated, double-walled, fibrous conduit comprising two fibrous tubes bonded together, in fixed, concentric, telescoped relationship, by a water soluble dextrine adhesive that is in the form of a soft, easily spreadable paste at room temperatures and is deposited as a relatively thin bonding film between the contiguous walls of the two tubes, said tubes being displaced for a short section of their length to provide correspondingly short plug or socket coupling elements of equal length at the respective ends of the conduit, and said conduit being adapted for impregnation by a suitable waterproofing material.

9. A prefabricated, double-walled, fibrous coupling comprising two relatively short fibrous tubes bonded together, in fixed concentric, telescoped relationship, by an adhesive that is in the form of a soft, easily spreadable paste at room temperatures and is deposited as a relatively thin bonding film between the contiguous walls of the two tubes, said tubes being of unequal length and being located one within the other so as to provide relatively short socket coupling elements of equal length at the respective ends of the coupling, and said coupling being adapted for impregnation by a suitable waterproofing material.

10. A prefabricated, double-walled, fibrous coupling comprising two relatively short fibrous tubes bonded together, in fixed, concentric, telescoped relationship, by an adhesive that is in the form of a soft, easily spreadable paste at room temperatures and is deposited as a relatively thin bonding film between the contiguous walls of the two tubes, said tubes being of unequal length and being located one within the other so as to provide relatively short plug elements of equal length at the respective ends of the coupling, and said coupling being adapted for impregnation by a suitable waterproofing material.

11. A prefabricated, double-walled, fibrous adapter-coupling comprising two relatively short fibrous tubes bonded together, in fixed, concentric, telescoped relationship, by an adhesive that is in the form of a soft, easily spreadable paste at room temperatures and is deposited as a relatively thin bonding film between the contiguous walls of the two tubes, said tubes being displaced for a short section of their length to provide correspondingly short plug or socket coupling and adapter elements of equal length at the respective ends of the adapter-coupling, at least one end of the inner tube of said two concentric, telescoped tubes being tapered to provide an adapter element, said adapter-coupling being adapted for impregnation by a suitable waterproofing material.

12. A prefabricated, double-walled, fibrous adapter-coupling comprising two relatively short fibrous tubes of unequal length, bonded together, in fixed, concentric, telescoped relationship, by an adhesive that is in the form of a soft, easily spreadable paste at room temperatures and is deposited as a relatively thin, bonding film between the contiguous walls of the two tubes, said tubes being displaced for a short section of their length to provide correspondingly short coupling elements of equal length at the respective ends of the adapter-coupling, at least one end of the inner tube of said two concentric, telescoped tubes being tapered to provide an adapter for coupling with a complementary shaped end of another conduit, and at least one end of said inner tube being a plug end, and said adapter-coupling being adapted for impregnation by a suitable waterproofing material.

13. A prefabricated, double-walled, fibrous adapter-coupling comprising two relatively short fibrous tubes bonded together, in fixed, concentric, telescoped relationship, by an adhesive that is in the form of a soft, easily spreadable paste at room temperatures and is deposited as a relatively thin bonding film between the contiguous walls of the two tubes, said tubes being displaced for a short section of their length to provide correspondingly short plug or socket coupling elements of equal length at the respective ends of the adapter-coupling, the outer tube of this coupling having a relatively thick wall as compared with the inner tube which it surrounds, and at least one end of the inner tube being tapered to provide an adapter for coupling with another type of conduit, and said adapter-coupling being adapted for impregnation by a suitable waterproofing material.

EDWARD S. REID.